United States Patent
Geboes et al.

(10) Patent No.: US 11,986,783 B2
(45) Date of Patent: May 21, 2024

(54) DISPENSING SYSTEM FOR MIXTURE OF TWO COMPONENTS AND STATIC MIXING NOZZLE THEREFOR

(71) Applicant: Soudal, Turnhout (BE)

(72) Inventors: Peter Geboes, Turnhout (BE); Ivan Boeykens, Turnhout (BE); Thomas Duijsters, Turnhout (BE); Lieven Sichien, Turnhout (BE)

(73) Assignee: Soudal, Turnhout (BE)

( * ) Notice: Subject to any disclaimer, the term of this patent is extended or adjusted under 35 U.S.C. 154(b) by 745 days.

(21) Appl. No.: 17/059,229

(22) PCT Filed: Mar. 29, 2019

(86) PCT No.: PCT/EP2019/058068
§ 371 (c)(1),
(2) Date: Nov. 26, 2020

(87) PCT Pub. No.: WO2019/228693
PCT Pub. Date: Dec. 5, 2019

(65) Prior Publication Data
US 2021/0205767 A1    Jul. 8, 2021

(30) Foreign Application Priority Data

May 29, 2018    (EP) .................................... 18174921

(51) Int. Cl.
*B01F 5/06*    (2006.01)
*B01F 23/47*    (2022.01)
(Continued)

(52) U.S. Cl.
CPC .......... *B01F 25/4231* (2022.01); *B01F 23/47* (2022.01); *B01F 25/4233* (2022.01);
(Continued)

(58) Field of Classification Search
CPC .. B01F 25/4231; B01F 25/4233; B29B 7/325; B29B 7/7419
See application file for complete search history.

(56) References Cited

U.S. PATENT DOCUMENTS 3,330,484 A * 7/1967 Johnson ................ B29B 7/7438
239/428
3,759,450 A * 9/1973 Fram ..................... B29B 7/7457
239/432

(Continued)

FOREIGN PATENT DOCUMENTS

CN    205909370 U    1/2017
EP    1407823 A2    4/2004
(Continued)

*Primary Examiner* — J C Jacyna
(74) *Attorney, Agent, or Firm* — N.V. Nederlandsch Octrooibureau

(57) ABSTRACT

Dispensing system for dispensing a mixture of a first component and a second component, the dispensing system comprising: (i) a dispensing gun comprising an inlet body with a first passage for feeding in the first component under pressure and a second passage for feeding in the second component under pressure, the first and second passages respectively comprising a closable first outlet and a closable second outlet, which may be operable by means of a handle or trigger of the dispensing gun; (ii) a static mixing nozzle, detachably connectable to the outlets of the body and provided for mixing and dispensing the components, the static mixing nozzle comprising a first section containing a first chamber and a second chamber for conducting the first and second component respectively and a second section, subsequent to the first section (in forwards flow direction), containing a mixing chamber with static mixing elements which promote mixing the first and second components and conducting the mixture to a nozzle tip serving as an outlet for the mixture. According to the invention, at least one of
(Continued)

the first and second chambers of the static mixing nozzle contains a series of static backflow prevention elements, arranged for hindering backflow of the respective component within the respective chamber.

19 Claims, 5 Drawing Sheets

(51) Int. Cl.
- *B01F 25/421* (2022.01)
- *B29B 7/32* (2006.01)
- *B29B 7/74* (2006.01)
- *B05B 7/04* (2006.01)

(52) U.S. Cl.
CPC ............ *B29B 7/325* (2013.01); *B29B 7/7419* (2013.01); *B29B 7/7438* (2013.01); *B29B 7/7457* (2013.01); *B05B 7/0408* (2013.01)

(56) References Cited

U.S. PATENT DOCUMENTS

| | | | |
|---|---|---|---|
| 3,801,009 A * | 4/1974 | Marshall, III | B05B 1/3066 239/433 |
| 4,676,437 A | 6/1987 | Brown | |
| 6,021,961 A | 2/2000 | Brown | |
| 2005/0045741 A1* | 3/2005 | Brown | B05B 1/3066 239/318 |
| 2009/0152300 A1* | 6/2009 | Hayman | B01F 33/5011 222/137 |
| 2012/0292343 A1* | 11/2012 | Zimmerman | B05B 7/12 222/145.5 |
| 2014/0339336 A1* | 11/2014 | Ogonowski | C08G 18/4018 239/310 |

FOREIGN PATENT DOCUMENTS

| | | |
|---|---|---|
| EP | 1652589 A2 | 5/2006 |
| EP | 2781253 A1 | 9/2014 |
| EP | 3299082 A1 | 9/2016 |

* cited by examiner

DISPENSING SYSTEM FOR MIXTURE OF TWO COMPONENTS AND STATIC MIXING NOZZLE THEREFOR

FIELD OF THE INVENTION

The present invention relates to a dispensing system for dispensing a mixture of a first component and a second component, and a static mixing nozzle therefor.

BACKGROUND ART

A two-component dispensing system is known from EP 1 407 823 A2, which discloses a dispensing appliance comprising a gun with first and second outlets and a nozzle composed of an intermediate piece and an extension piece. The intermediate piece is provided with a first and a second channel, which channels in each case extend between the first and second outlets of the gun and a mixing chamber. The intermediate piece is detachably connected to an extension piece provided with a hollow space that can be closed off by the intermediate piece in order to form the mixing chamber. The two components run in separate channels in the intermediate piece, so no mixing occurs there, so that the outlets of the chambers cannot become clogged up with solidified foam.

Other two-component or multi-component dispensing systems are known from U.S. Pat. Nos. 4,676,437 A and 6,021,961 A, which disclose systems comprising a dispensing gun and a replaceable nozzle. From U.S. Pat. No. 6,021,961 A it is known to include a backflow valve in the nozzle, formed by a flexible membrane.

SUMMARY OF THE INVENTION

It is a first aim of the present invention to provide a dispensing system for dispensing a mixture of a first component and a second component, or a static mixing nozzle therefor, with an alternative construction for reducing the risk of backflow of the mixture of components into outlets of the dispensing gun.

It is a second aim of the present invention to provide a dispensing system or a static mixing nozzle therefor, wherein the risk of backflow is reduced without using moving parts.

It is a third aim of the present invention to provide a dispensing system or a static mixing nozzle therefor which has a simple construction.

One or more of the above aims may be achieved with the dispensing system, or static mixing nozzle therefor, as defined in the independent claims.

The invention provides, according to a first aspect, a dispensing system for dispensing a mixture of a first component and a second component, the dispensing system comprising: (i) a dispensing gun comprising an inlet body with a first passage for feeding in the first component under pressure and a second passage for feeding in the second component under pressure, the first and second passages respectively comprising a closable first outlet and a closable second outlet, which may be operable by means of a handle or trigger of the dispensing gun; (ii) a static mixing nozzle, detachably connectable to the outlets of the body and provided for mixing and dispensing the components, the static mixing nozzle comprising a first section containing a first chamber and a second chamber for conducting the first and second component respectively and a second section, subsequent to the first section (in forwards flow direction), containing a mixing chamber with static mixing elements which promote mixing the first and second components and conducting the mixture to a nozzle tip serving as an outlet for the mixture. According to the invention, at least one of the first and second chambers of the static mixing nozzle contains a series of static backflow prevention elements, arranged for hindering backflow of the respective component within the respective chamber.

It has been found that the risk of backflow of the mixture can be effectively prevented by arranging, in at least one, preferably both the first and second chambers, a series of static backflow prevention elements. The use of static elements for this purpose has the advantage that the use of moving parts can be prevented and that a simple construction for the static mixing nozzle can be achieved.

In embodiments according to the invention, the series of static backflow prevention elements may be formed by a plurality of walls, dividing the respective chamber up into at least two compartments. It has been found that by dividing the chamber up into compartments, which preferably have a volume of 50 to 400 mm$^3$, backflow into the outlets of the dispensing gun can be effectively prevented as the backflowing mixture has to flow back through the multiple compartments before it can reach the outlets. Furthermore, the division into compartments, in particular with the preferred minimal volume, can ensure that there is always at least one compartment which contains 100%, or almost 100% of the respective one component.

In embodiments according to the invention, the plurality of walls may comprise two alternating sets of walls which protrude into the chamber from two opposing side walls of the chamber.

In embodiments according to the invention, the walls may be arranged in a slanting direction with respect to the forwards flow direction of the respective component through the respective chamber. The slanting direction may for example be 45° with respect to the main, forwards flow direction of the components through the nozzle (i.e. the longitudinal direction of the nozzle). Arranging the walls in slanting direction may have one or more of the following advantages: forming less of a hindrance in forwards flow direction with respect to backflow direction, forming relatively more compartments per length of the nozzle.

In embodiments according to the invention, the flow path for the respective component may be formed by a series of orifices through the static backflow prevention elements, preferably arranged in a zig-zag configuration. It has been found that by providing such a series of orifices, backflow into the outlets of the dispensing gun can be effectively prevented as the backflowing mixture has to flow back through the multiple orifices before it can reach the outlets.

In embodiments according to the invention, the static mixing elements may comprise a further series of walls forming a meandering or spiraling flow path through the mixing chamber.

In embodiments according to the invention, the static mixing nozzle may be an assembly of a sleeve and an insert, the insert fitting into a cavity of the sleeve. This has the advantage that manufacturing of the nozzle may be simplified. For example, the sleeve and the insert may be made of different materials, optimized for their respective purpose.

In embodiments according to the invention, the static mixing elements and the static backflow prevention elements may be provided on the insert. This has the advantage that manufacturing of the nozzle may be simplified, for example because all the structures to be provided on the inside of the nozzle are made on the insert, which makes it possible to manufacture both parts by injection moulding.

In embodiments according to the invention, the sleeve may be made of a transparent material, allowing visual inspection of the first, second and mixing chambers.

In embodiments according to the invention, the lengths of the first and second chambers of the mixing nozzle may be a minimum length of 10 mm.

In embodiments according to the invention, the nozzle tip may be detachable from the static mixing nozzle and the system may comprise a plurality of interchangeable nozzle tips.

The invention provides, according to a second aspect, which may be combined with other aspects and embodiments described herein, a static mixing nozzle for mixing a first component and a second component and dispensing the mixture, the static mixing nozzle comprising: (i) an inlet part, detachably connectable to outlets of a dispensing gun via which said components are supplied to the inlet part; (ii) a first section containing a first chamber and a second chamber for conducting the first and second component respectively; and (iii) a second section (subsequent to the first section) containing a mixing chamber with static mixing elements which promote mixing the first and second components and conducting the mixture to a nozzle tip serving as an outlet for the mixture. At least one of the first and second chambers of the static mixing nozzle may contain a series of static backflow prevention elements, arranged for hindering backflow of the respective component within the respective chamber.

In embodiments, the static mixing nozzle may comprise features as described elsewhere herein.

The invention provides, in a third aspect, a process of forming a polyurethane foam comprising: (i) providing an isocyanate component comprising a diisocyanate or a polyisocyanate and optionally a blowing agent and/or further additives; (ii) providing a polyol component comprising a blowing agent, a catalyst, a polyol and optionally further additives; and (iii) mixing said isocyanate component and said polyol component to form the polyurethane foam in a static mixing nozzle according to the second aspect.

BRIEF DESCRIPTION OF THE DRAWINGS

The present invention will be discussed in more detail below, with reference to the attached drawings.

DESCRIPTION OF EMBODIMENTS

Figure 1:
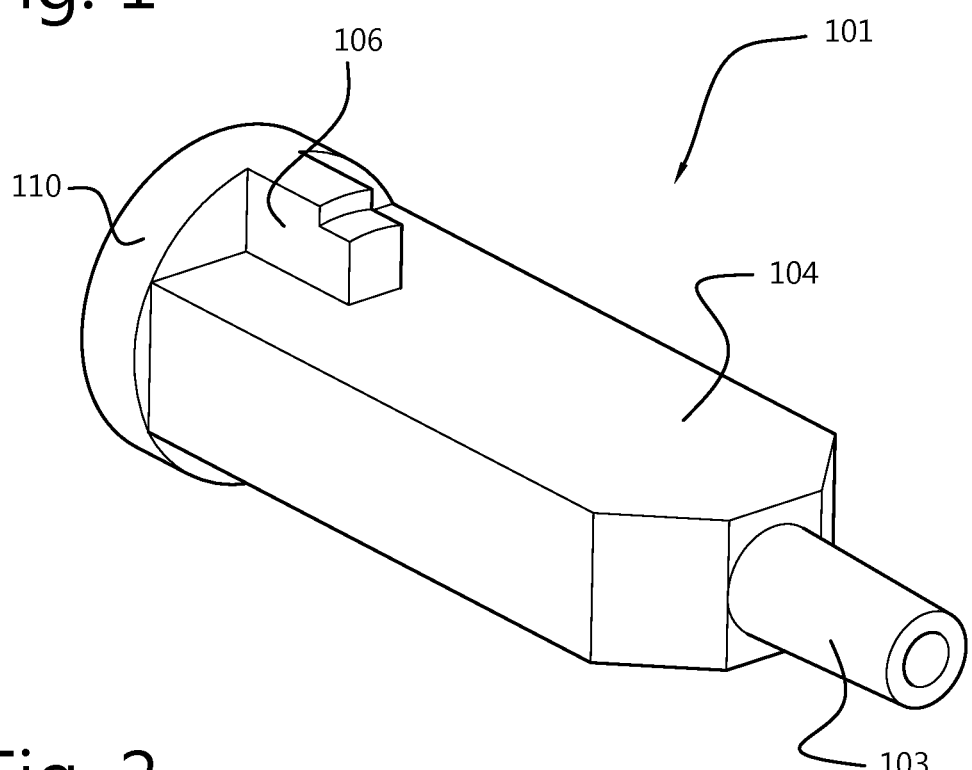
FIGS. 1 and 2 show perspective views of the external sleeve of a static mixing nozzle according to a first embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

A first embodiment of a static mixing nozzle according to the invention will be described with references to FIGS. 1-9. The embodiment shown is intended for use with dispensing guns of the type known from U.S. Pat. Nos. 4,676,437 A and 6,021,961 A, or similar dispensing guns, which are known per se and are therefore not described herein in detail. Embodiments of static mixing nozzles within the scope of the present invention may also be adapted for use with other, known dispensing guns, for example dispensing guns of the type comprising closable outlets which are closable by means of a needle in each passage, which enters a narrow tip of the bore and closes the discharge openings of each bore.

Figure 2:
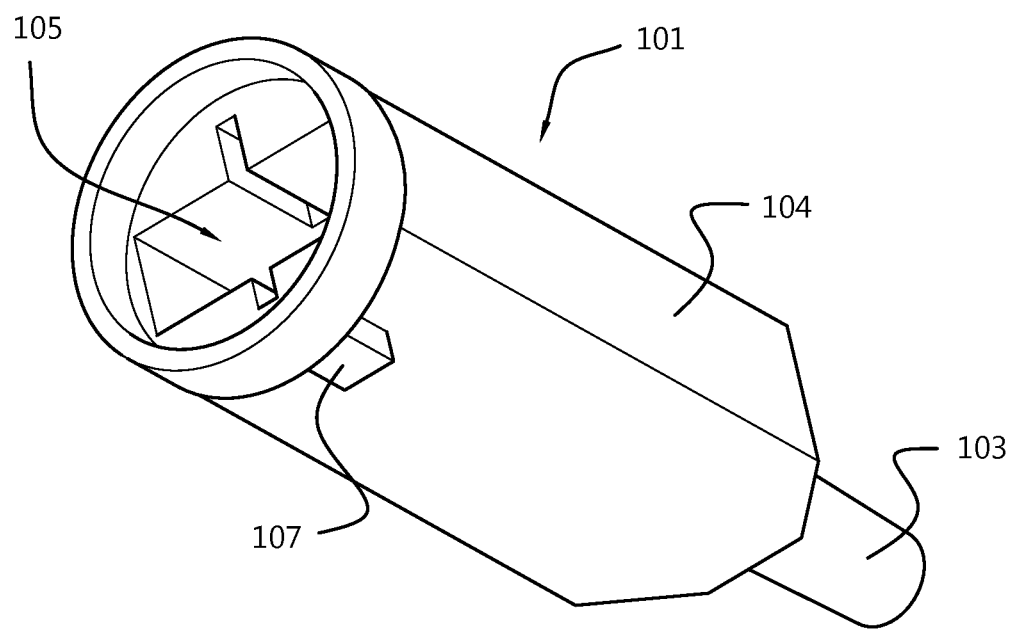

FIGS. 1-9 show a two-component static mixing nozzle 100 as an assembly of a sleeve 101 and insert 102. The nozzle 100 is configured so that the insert 102 is inserted into a cavity 105 present within the sleeve 101, as shown in FIG. 2. The sleeve 101 is configured to surround the framework 111 of the insert 102 in such a manner that first and second components cannot migrate through alternate paths other than those provided by a first chamber 108, second chamber 108' and mixing chamber 109, ensuring no leakage. The sleeve 101 covers the insert 102 by means of a body 104 which covers the first chamber 108, second chamber 108' and mixing chamber 109 of the insert around the longitudinal axis. The sleeve 101 is preferably composed of a transparent material, allowing visual inspection of the first chamber 108, second chamber 108' and mixing 109 chamber.

The body 104 is rectangular with a conical periphery at one end. The opposite end of the body 104 has a cylindrical part 110 which allows for an air-tight connection when placing the insert 102 into the sleeve 101. The cylindrical part 110 comprises a clip 106 which is complementary to a component of the dispensing gun (not shown), affording a locking mechanism when the component of the dispensing gun is placed within the clip. An additional clip 107 of smaller dimensions is attached to the cylindrical part 110, opposite to clip 106 and ensures the sleeve 101 is not misplaced (potentially resulting in premature mixing) when the static mixing nozzle 100 is in operation.

FIG. 1 shows the body 104 of the sleeve 101 is rectangular at the base but conical at the periphery, with the width of the body decreasing towards the nozzle tip 103. This decrease in width allows the static mixing nozzle 100 to be suitable in use for small area applications. In alternative embodiments, the sleeve may also have other shapes, such as for example cylindrical or conical.

The sleeve 101 comprises a nozzle tip 103 which acts as an outlet for the mixed first and second components, as shown in FIG. 1. The nozzle tip 103 is conical in shape, and contains a hollow outlet which is connected to the mixing chamber 109 and allows for the dispensing of the mixed components. The nozzle tip 103 and its outlet decrease in diameter as it extends outwards from the body 104. This decrease in diameter allows for the application of the mixed components to smaller surface areas. The size of the nozzle tip 103 may be chosen depending on the application.

Figure 3:
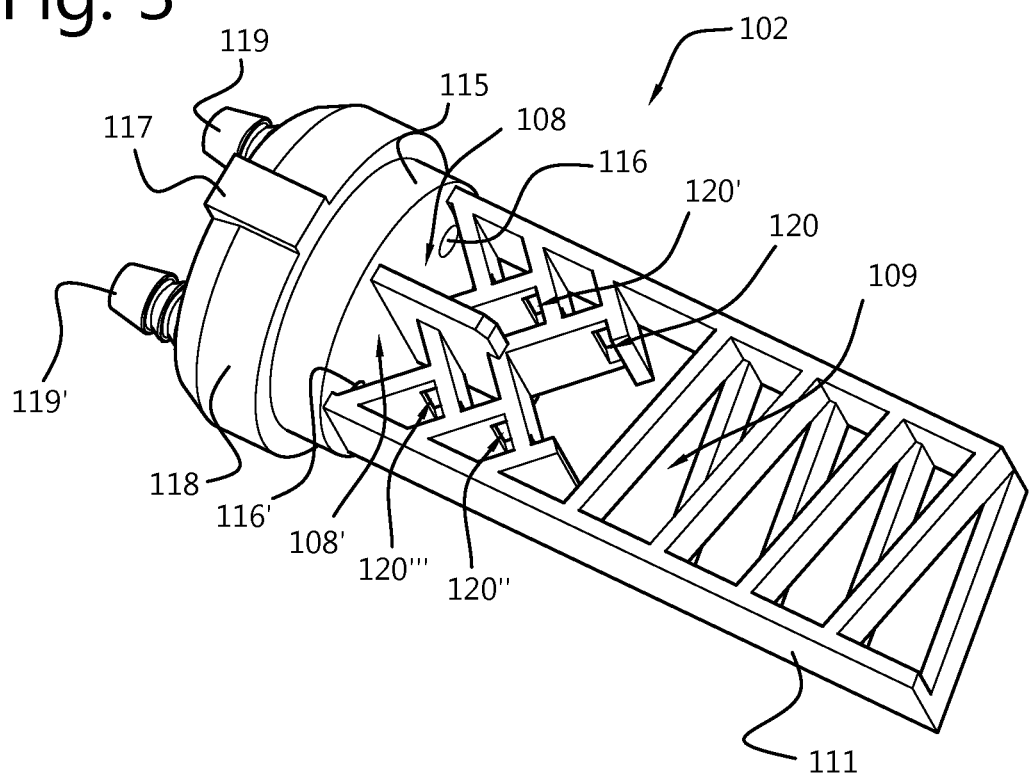
FIGS. 3 and 4 show perspective views of the internal component of a static mixing nozzle according to the first embodiment of the invention.
Figure 4:
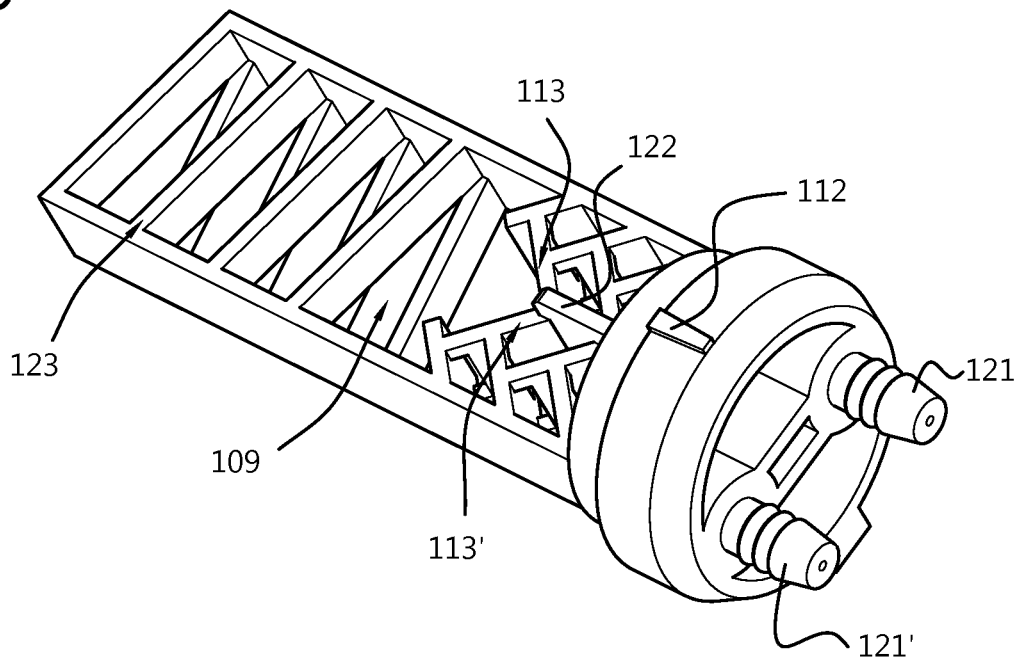
Figure 5:
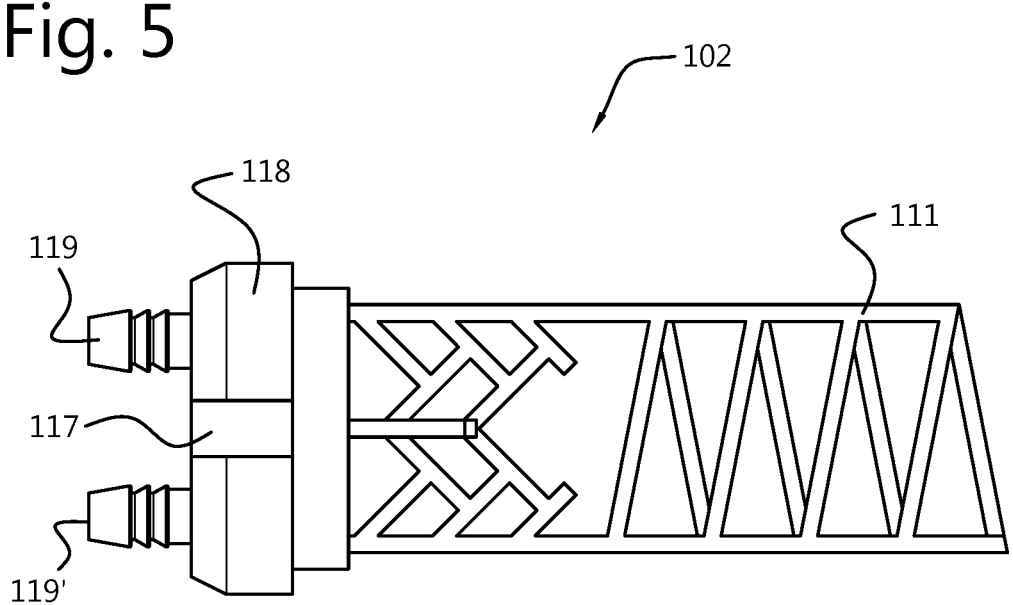
FIG. 5. shows a top-view of the internal component comprising the first and second chambers and the static mixing chamber.
Figure 6:
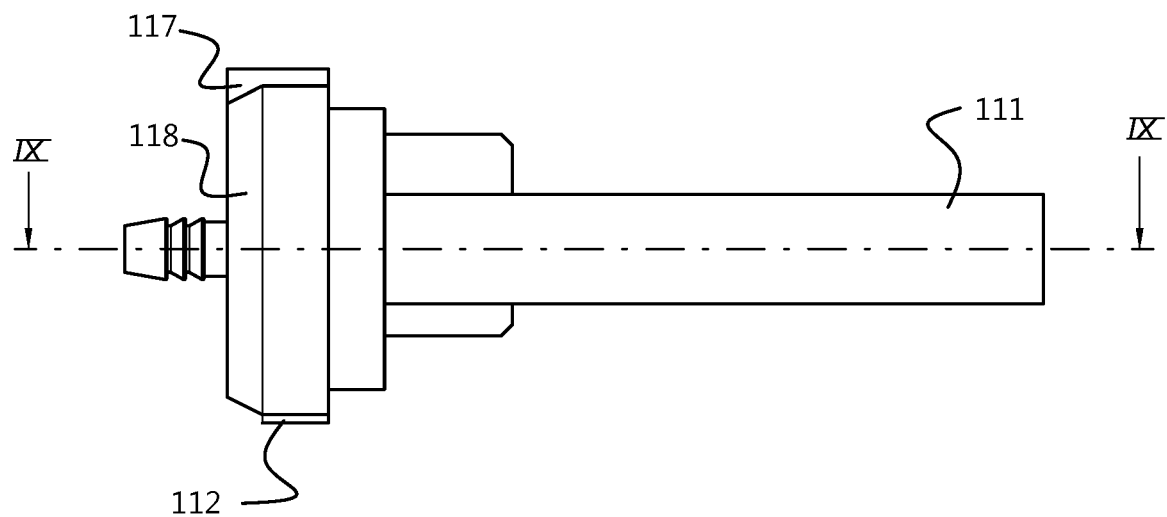
FIG. 6. shows a side-view of the internal component comprising the first and second chambers and the static mixing chamber.
Figure 7:
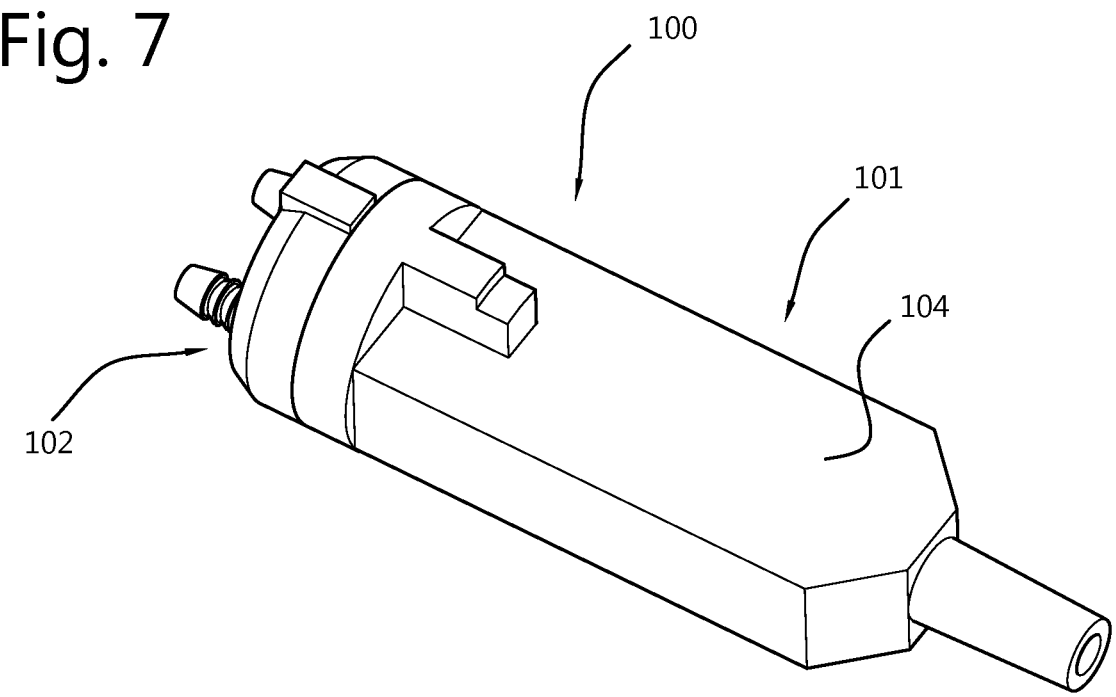
FIGS. 7 and 8 show perspective views of the static mixing nozzle, showing the internal component inserted into the external sleeve.
Figure 8:
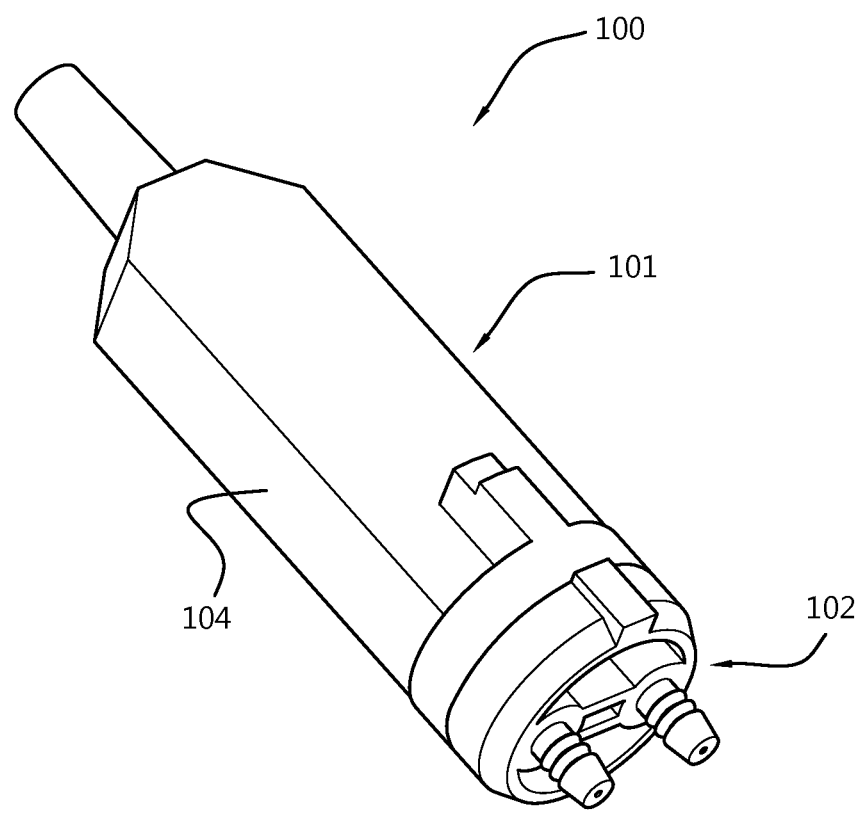
Figure 9:
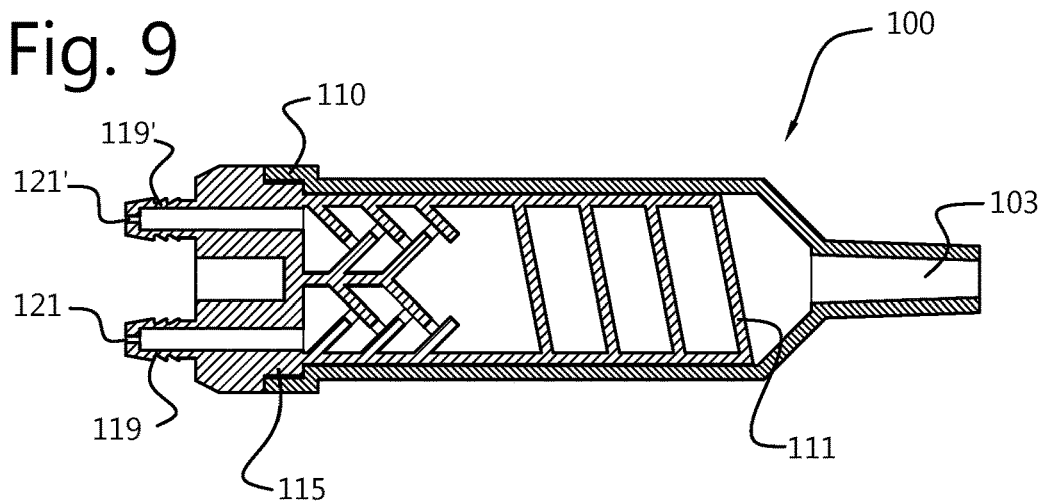
FIG. 9 shows a cross-sectional view of the static mixing nozzle, showing the internal component inserted into the external sleeve.

FIGS. 3 and 4 show the insert 102 comprises a framework 111 for the mixing and dispensing of a first and second component. The framework 111 defines a first chamber 108 for a first component, a second chamber 108' for a second component, which isolate the first and second components prior to mixing in the mixing chamber 109, which is subsequent to the first and second chambers in the flow path of both components through the nozzle. The framework 111 defines the series of backflow prevention elements 113, 113' for each chamber 108, 108'. The series of static backflow prevention elements is formed by a plurality of walls, dividing the respective chamber 108, 108' up into a plurality of compartments, with orifices in the walls connecting the compartments and providing the flow path for the respective component. In the embodiment shown, each chamber has four compartments. Preferably, there are at least two such compartments in each chamber. By dividing the chambers up into compartments, which preferably have a volume of 50 to 400 mm$^3$, backflow into the outlets of the dispensing gun can be effectively prevented as the backflowing mixture has to flow back through the multiple compartments before it can reach the outlets of the dispensing gun. Furthermore, the division into compartments, in particular with the preferred minimal volume, can ensure that there is always at least one compartment which contains 100%, or almost 100% of the respective one component. The chambers 108, 108' in combination with their respective inlet nipples 109, 109' may have a combined volume of 200 to 2000 mm$^3$, preferably 400 to 1000 mm$^3$. The volume is chosen as a trade-off between having at least a minimum amount of unmixed component in the respective chamber and not wasting too much component in the nozzle.

In the embodiment shown, the plurality of walls are arranged in a slanting direction with respect to the forwards flow direction of the respective component through the respective chamber. In the embodiment shown, the slanting direction is 45° with respect to the main, forwards flow direction of the components through the nozzle (i.e. the longitudinal direction of the nozzle), such that they form less of a hindrance in forwards flow direction with respect to backflow direction. Also, the arrangement of the walls in this direction has the advantage of forming relatively more compartments per length of the nozzle, as the subsequent compartments are arranged partly next to each other. In alternative embodiments, the walls may however also be arranged in other directions or angles with respect to the forwards flow path. Also, the walls may be curved to direct the flow of the components through the respective chambers.

In the embodiment shown, the flow path for the respective component is formed by the series of orifices 120, 120' and 120", 120''' through the walls, which are arranged in a zig-zag configuration, which contributes to preventing or hindering the backflow.

On the inlet side, the insert 102 further comprises a platform 115 which aids airtight connectivity when the insert is placed into the cavity 105 of the sleeve 101, complementary to the cylindrical part 110. The platform 115 contains a first 116 and second 116' hole which act as outlets for a first and second component into the respective first chamber 108 and second chamber 108'. The opposite side of the platform 115 is attached to a cylindrical component 118 which is configured to support the connection of the dispensing gun (not shown) to the insert 102. The cylindrical component 118 comprises a clip 117 which affords a fastening mechanism for the attachment of the static nozzle 100 to the dispensing gun (not shown). The cylindrical component 118 further comprises a first 119 and second 119' nipple with lip seals used for attaching the insert 102 to the dispensing gun (not shown) via a snap shut mechanism. A protrusion 112 is provided on the cylindrical component 118 to ensure the correct orientation of the insert in the sleeve 101.

FIG. 4 shows the first 119 and second 119' nipples comprising a first 121 and second 121' feed which act as inlets for the first and second components from the dispensing gun (not shown) into the static mixing nozzle 100. The first 121 and second 121' feeds provide a path for components that lead to the first 116 and second 116' holes, allowing for the first and second component to enter their respective chambers. The feeds 121, 121' have small inlet hole, the size of which is chosen to control the supply rate of components to the respective first chamber 108 and second chamber 108' chamber.

FIG. 4 shows the first chamber 108 and second chamber 108' are separated by a central wall 122, which isolates the first and second components as they tunnel through to the static mixing chamber 109. The first chamber 108 and second chamber 108' comprise a series of static backflow prevention elements 113, which slant diagonally in the direction of the forward component flow and inhibit the backflow of components into the body of the dispensing gun (not shown). The static backflow prevention elements 113 protrude into the chamber from both the central wall 13 and the outer walls of the chamber resulting in a zig zag configuration. A series of orifices 120, 120', 120" and 120''' within the static backflow prevention elements 113 allow for the movement of the first and second components through the chambers, following a zig-zag motion. The zigzag motion ensures an increased path length for the first and second components and a decrease in the possibility of the mixed components clogging the dispensing gun (not shown). The orifices 120, 120', 120" and 120'" and the first 116 and second 116' holes are larger than the inlet holes of the nipples, such that the supply rate is defined by the small inlet holes 121, 121'.

FIG. 4 shows, in the mixing chamber 109, a series of static mixing elements 123 which aid the mixing of the components. The mixing elements 123 are diagonal artefacts which protrude from the two opposite ends of the static mixing chamber 109. The mixing elements 123 are arranged in a slanting direction with respect to the forward flow direction of the components through the mixing chamber and define a helical flow path for the mixture of the components through the nozzle, so as to promote the mixing. The volume of the mixing chamber is preferably chosen as small as possible so as to avoid waste of components, while being large enough and/or having sufficient mixing elements to achieve a desired degree of mixing of the components. Various embodiments of static mixing chambers and/or static mixing elements are known in the art and will therefore not be further elaborated here.

Figure 10:
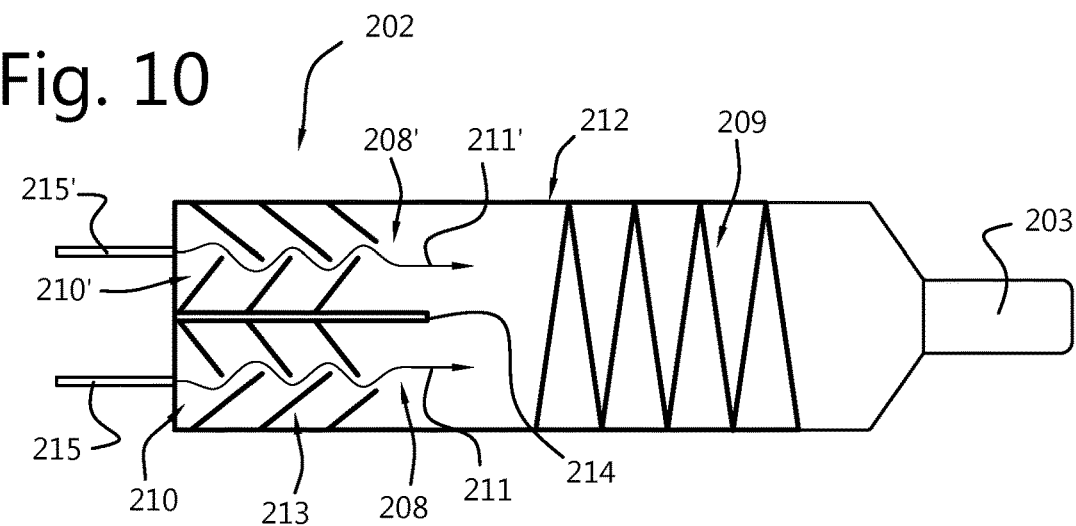
FIG. 10 shows a schematic view of a second embodiment of a static mixing nozzle according to the invention.

FIG. 10 schematically shows a second embodiment of a static mixing nozzle 202, likewise comprising an insert with a framework 212, inserted into a sleeve for the mixing and dispensing of a first and second component. A first and second component enter the framework 212 by a first 215 and second 215' nipple which act as inlets for the components from a dispensing gun (not shown). The framework 212 likewise comprises a first 208, second 208' and static 209 mixing chamber. The first 208 and second 208' chambers are isolated from each other by a central wall 214 and comprise a series of static backflow prevention elements 213. The static backflow prevention elements 213 protrude into the chamber from both the central wall 214 and the outer walls of the chamber, slanting diagonally in the direction of component flow. The static backflow prevention elements 213 are employed to inhibit the backflow of a mixture of the first and second components from entering a dispensing gun (not shown). The first and second components follow their respective first 211 and second 211' flow paths towards the static mixing chamber 209. The first 211 and second 211' flow paths follow a zigzag conformation afforded by vacant spaces amongst the static backflow prevention elements 213. The first chamber 208 and first nipple 215 can have a combined volume of 200 to 2000 mm$^3$. As the first 208 and second 208' chambers and their respective first 215 and second 215' nipples are of equal dimensions, the second chamber 208' and second nipple 215' can also have a combined volume of 200 to 2000 mm$^3$. In a preferred embodiment the combined volume of a chamber and its respective nipple is 400 to 1000 mm$^3$. The series of static backflow prevention elements is formed by a plurality of walls, defining a plurality of planes dividing the respective chamber 208, 208' up into a plurality of compartments. The compartments, may have a volume of 50 to 400 mm$^3$. The first compartments 210 and 210' in their respective first 208 and second 208' chambers have larger dimensions and hence, possess a larger volume than the subsequent compartments. The framework 212 has at least two compartments and a preferred embodiment has at least four compartments.

Figure 11:
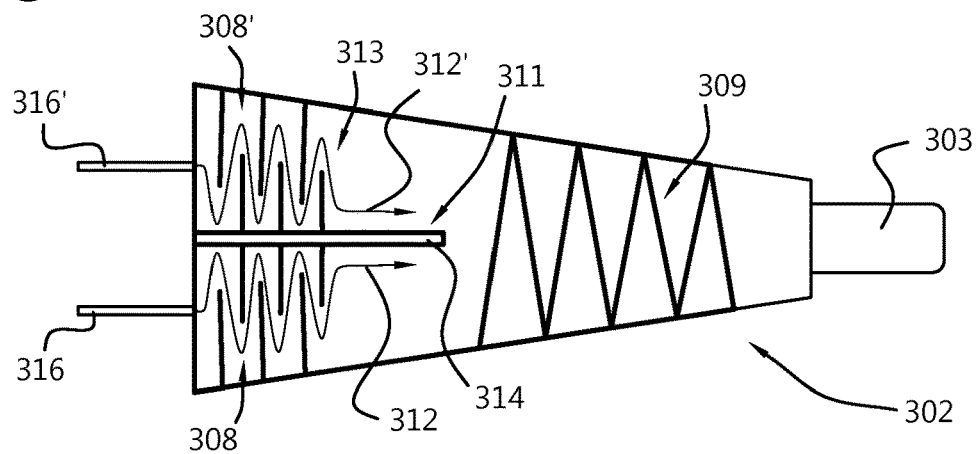
FIG. 11 shows a schematic view of a third embodiment of a static mixing nozzle according to the invention.

FIG. 11 schematically shows a third embodiment of a static mixing nozzle 302, likewise comprising a framework 311 for the mixing and dispensing of a first and second component. The nozzle 302 has a conical conformation, with the width of the nozzle decreasing in size towards the nozzle tip 303, allowing the static mixing nozzle to be used more readily for small-area applications.

A first and second component enter the framework 311 by a first 316 and second 316' nipple which act as inlets for the components from a dispensing gun (not shown). The framework 311 likewise comprises a first 308, second 308' and static 309 mixing chamber. The first 308 and second 308' chambers are isolated from each other by a central wall 314 and comprise a series of static backflow prevention elements 313. The static backflow prevention elements 313 protrude into the chamber from both the central wall 314 and the outer walls of the chamber at angles perpendicular to their origin. Static backflow prevention elements 313 are employed to inhibit the backflow of a mixture of the first and second components from entering a dispensing gun (not shown). The first and second components follow their respective first 312 and second 312' flow paths towards the static mixing chamber 309. The first 312 and second 312' flow paths follow a zigzag conformation afforded by vacant spaces amongst the static backflow prevention elements 313. The first chamber 308 and first nipple 316 can have a combined volume of 200 to 2000 mm$^3$. As the first 308 and second 308' chambers and their respective first 316 and second 316' nipples are of equal dimensions, the second chamber 308' and second nipple 316' can also have a combined volume of 200 to 2000 mm$^3$. In a preferred embodiment the combined volume of a chamber and its respective nipple is 400 to 1000 mm$^3$. The series of static backflow prevention elements is formed by a plurality of walls, defining a plurality of planes dividing the respective chamber 308, 308' up into a plurality of compartments. The compartments, may have a volume of 50 to 400 mm$^3$. The framework 311 has at least two compartments and a preferred embodiment has at least four compartments.

In the following, possible components with which the static mixing nozzle of FIGS. 1-9 or other embodiments according to the invention can be used, will be described.

Reference is made to substances, components, or ingredients in existence at the time just before first contacted, formed in situ, blended, or mixed with one or more other substances, components, or ingredients in accordance with the present disclosure. A substance, component or ingredient identified as a composition, a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skills of an average chemist. The transformation of chemical reactants or starting materials to chemical products or final materials is a continually evolving process, independent of the speed at which it occurs. Accordingly, as such a transformative process is in progress there may be a mix of starting and final materials, as well as intermediate species. Unless otherwise indicated herein, definitions of (relative) amounts of components concern the composition as is.

In preferred embodiments the dispensing system in accordance with the current invention is provided for dispensing polyurethane or polyisocyanurate foams. When dispensed, the liquid contents may come out as frothed foam which reacts and cures to form the polyurethane or polyisocyanurate polymer.

The spray foam industry traditionally works with two components which are mixed, an isocyanate component (also referred to as the "A" component) and a polyol component (also referred to as the "B" component). The "A"

and "B" designations may be reversed in some areas. However, the invention is not limited to dispensing systems for two components and can be generally applied to systems for mixing and dispensing multiple components.

Thus, there is provided a dispensing system for dispensing a mixture of (at least) a first component and a second component, wherein the first component may comprises a diisocyanate or a polyisocyanate and optionally a blowing agent and/or further additives, and the second component may comprise a blowing agent, a catalyst, a polyol and optionally further additives.

The polyol component may comprise a single polyol or several polyols, often employed and sold as a polyol pre-mix. The one or more polyols present in the polyol component may be any polyol known in the art to prepare a polyurethane foam. As used herein "polyol" refers to a molecule that has an average of greater than 1.0 hydroxyl group per molecule. As used herein, "polyol pre-mix" refers to the total mixture of polyols present in the polyol component, irrespective of their origin (e.g. added separately to the polyol component or added as a pre-blended mixture of polyols which may have been sold as such).

Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; an aliphatic polyester polyol; an aromatic polyether polyol; an aliphatic polyether polyol; a mannich polyol; an amino polyol; a polybutadiene polyol; a polycaprolactone polyol; a polycarbonate polyol; a hydroxyl terminated polyolefin polyol; a graft polyol; glycerol; ethylene glycol; diethylene glycol; propylene glycol-containing polyol; graft copolymers of polyether polyols with a vinyl polymer; a copolymer of a polyether polyol with a polyurea; one or more of (a) condensed with one or more of (b): (a) glycerine, ethylene glycol, diethylene glycol, trimethylolpropane, pentaerythritol, soy oil, lecithin, tall oil, palm oil, castor oil; (b) ethylene oxide, propylene oxide, a mixture of ethylene oxide and propylene oxide; or combinations thereof; aliphatic polyester polyols, aromatic polyester polyols and combinations thereof.

The polyols generally have a molecular weight range of from 200 to 6000 g/mol, more preferably from 250 to 2000 g/mol, and most preferably from 250 to 1000 g/mol.

The polyol or at least one polyol of the polyol pre-mix preferably has a hydroxyl number (OH number) ranging from 28 to 800 mg/KOH g. Hydroxyl number indicates the number of reactive hydroxyl groups available and is expressed as the number of milligrams of potassium hydroxide equivalent to the hydroxyl content of one gram of the polyol sample.

The polyol or at least one polyol of the polyol pre-mix preferably has a number average hydroxyl functionality (Fn) of 9 or less, more preferably 8 or less. Number average hydroxyl functionality refers to the average number of hydroxyl groups that are present on a molecule of the polyol and may be calculated as the ratio of the total moles of OH in the polyol or polyol pre-mix to the total moles of polyol.

In embodiments, the polyol or polyol pre-mix is present in the polyol component in an amount of from 20 wt. % to 95 wt. %, preferably from 30 wt. % to 60 wt. %, and more preferably from 40 wt. % to 50 wt. %, by total weight of the polyol component.

The blowing agent employed in the polyol component and/or the isocyanate component may be any blowing agent suitable for use in the formation of a polyurethane foam such as chlorofluorocarbon (CFC), hydrochlorofluorocarbon (HCFC), hydrofluorocarbon (HFC), hydrohaloolefin (HFO). In embodiments, the blowing agent has low or zero global warming potential (GWP) and ozone depletion potential (ODP). If a compound is referred to without any stereochemical designation (such as (cis), (trans), (E), (Z)), any stereoisomer of the compound is included.

In embodiments, the polyol component and/or the isocyanate component comprises gaseous hydrohaloolefin, preferably a gaseous hydrohaloolefin selected from 1,3,3,3-tetrafluoropropene (HFO 1234ze); 2,3,3,3-tetrafluoroprop-1-ene (HFO 1234yf); 1,1,3,3-tetrafluoropropene; 1,2,3,3,3-pentafluoropropene (HFO 1225ye); 3,3,3-trifluoropropene; 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez); or a combination thereof.

In embodiments, the polyol component and/or the isocyanate component comprises a liquid hydrohaloolefin blowing agent, preferably a liquid hydrohaloolefin blowing agent selected from 1,1,1,4,4,4-Hexafluoro-2-butene (HFO-1336mzz), 1-chloro-3,3,3,-trifluoropropene (HFO-1233zd) and combinations thereof, preferably HFO-1336mzz(Z), HFO-1233zd(E) and combinations thereof. It should be noted that the abbreviation "HFO" commonly used in the art when referring to liquid hydrohaloolefin blowing agents (such as HFO-1233zd) is sometimes replaced by the term "HCFO".

In embodiments, the blowing agent is present in the polyol component and/or the isocyanate component in an amount of 5-50 wt. %, preferably 10-30 wt. %, preferably 15-25 wt. % by total weight of that component. In embodiments, the blowing agent is present in the polyol component and/or the isocyanate component in an amount of more than 1 wt. %, preferably more than 5 wt. %, preferably more than 10 wt. %, preferably more than 15 wt. % by total weight of that component. In embodiments, the blowing agent is present in the polyol component and/or the isocyanate component in an amount of less than 70 wt. %, preferably less than 50 wt. %, preferably less than 40 wt. %, preferably less than 30 wt. % by total weight of that component.

The catalyst may include any amine catalyst, metal catalyst or combination thereof suitable to catalyze the formation of a polyurethane foam. Amine catalysts may include primary amine, secondary amine or tertiary amine catalysts. Metal catalysts may include one or more compounds comprising a metal selected from the group consisting of zinc, lithium, sodium, magnesium, barium, potassium, calcium, bismuth, cadmium, aluminum, zirconium, tin, or hafnium, titanium, lanthanum, vanadium, niobium, tantalum, tellurium, molybdenum, tungsten and cesium, such as organometallic compounds. In embodiments, the total amount of catalyst present in the polyol component is within the range of 0.1-15 wt. %, preferably of 0.5-10 wt. %, more preferably 1-7 wt. % by total weight of the polyol component.

The polyol component may comprise other materials such as, but not limited to, water, flame retardants, colorants, fillers, surfactants, additional catalysts, additional blowing agents, propellants, emulsifiers, solvents and/or plasticizers.

In embodiments, the dispensing system described herein is provided for additionally dispensing a third component. An example of a suitable third component is a chain extender component. To this end, the nozzle may comprise a third chamber via which the third component enters the nozzle, which may also comprise backflow prevention elements as disclosed herein.

The polyol component may comprise a diisocyanate, a polyisocyanate or combinations thereof. As used herein the term "polyisocyanate" represents any compound with 2 or more isocyanate groups. Any organic polyisocyanate can be employed in polyurethane foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. In embodiments in accordance with the invention, the isocyanate comprised in the isocyanate component is an organic polyisocyanate, for example a compound selected from the group formed by the aromatic diisocyanates (such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like); the aromatic triisocyanates (such as 4,4',4"-triphenylmethane triisocyanate, 2,4,6-toluene triisocyanates); the aromatic tetraisocyanates (such as 4,4'-dimethyldiphenylmethane-2,2',5,5'-tetraisocyanate); arylalkyl polyisocyanates (such as xylylene diisocyanate); aliphatic polyisocyanates (such as hexamethylene-1,6-diisocyanate, lysine diisocyanate methylester); polymethylene polyphenylisocyanates; hydrogenated methylene diphenylisocyanate; m-phenylene diisocyanate; naphthylene-1,5,-diisocyanate; 1-methoxyphenylene-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 3,3'-dimethyldiphenylmethane-4,4'-diisocyanate; alkylene diisocyanates (such as trimethylene diisocyanate, tetramethylene diisocyanate, and hexamethyl-ene diisocyanate, isophorene diisocyanate, 4,4'-methylenebis(cyclohexyl isocyanate)); aromatic polyisocyanates (such as m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl), methene, bis(2-methyl-4-isocyanatophenyl)methane); and combinations thereof.

In embodiments according to the present disclosure, there is provided a process of forming a polyurethane foam comprising: (i) providing an isocyanate component comprising a diisocyanate or a polyisocyanate and optionally a blowing agent and/or further additives; (ii) providing a polyol component comprising a blowing agent, a catalyst, a polyol and optionally further additives; and (iii) mixing said isocyanate component and said polyol component to form the polyurethane foam in a static mixing nozzle as described elsewhere herein.

In embodiments, mixing step (iii) comprises mixing the isocyanate component and the polyol component at a volume ratio of 2:1 to 1:2, preferably 1.5:1 to 1:1.5, preferably 1.2:1.2, preferably about 1:1, preferably 1:1.

In embodiments the process provided herein comprises providing the isocyanate component and/or the polyol component at a pressure of at least 5 bar, preferably at least 7 bar, preferably at least 15 bar.

In embodiments, mixing step (iii) comprises mixing the isocyanate component and the polyol component such that the NCO/OH stoichiometric ratio is in a range of from 0.9 to 5.0, preferably from 1.0 to 3.0, more preferably from 1.1 to 2.5.

In embodiments there is provided a process of forming a polyurethane foam as described herein, which further comprises a step of spraying the mixture of the isocyanate component and the polyol component obtained in step (iii).

When dispensing, a first and second component leave the dispensing gun (not shown) and enter the first 121 and second 121' feeding inlets of the insert 102. The first and second components tunnel through the cylindrical component 118 towards the respective first 116 and second 116' holes. The first 116 and second 116' holes act as outlets for the first and second components into the respective first 108 and second 108' chambers. The central wall 122 ensures that the first and second components remain separated as they zigzag through the orifices 120, 120', 120", 120''' within the series of static backflow prevention elements 113.

The first and second components exit the final orifices 120" and 120''' in the peripheral backflow prevention elements 113 and enter the mixing chamber 109. The first and second components are mixed, aided by their migration through a series of static mixing elements 123. The mixture of the first and second components exit the framework 111 and enter the nozzle tip 103. Once present within the nozzle tip 103, the mixture of components are dispensed.

The invention claimed is:

1. A dispensing system for dispensing a mixture of a first component and a second component, the dispensing system comprising:
    a dispensing gun comprising an inlet body with a first passage for feeding in the first component under pressure and a second passage for feeding in the second component under pressure, the first and second passages respectively comprising a closable first outlet and a closable second outlet;
    a static mixing nozzle, detachably connectable to the outlets of the body and provided for mixing and dispensing the components, the static mixing nozzle comprising a first section containing a first chamber and a second chamber for conducting the first and second component respectively and a second section, subsequent to the first section, containing a mixing chamber with static mixing elements which promote mixing the first and second components and conducting the mixture to a nozzle tip serving as an outlet for the mixture;
    wherein at least one of the first and second chambers of the static mixing nozzle contains a series of static backflow prevention elements, arranged for hindering backflow of the respective component within the respective chamber,
    wherein the flow path for the respective component is formed by a series of orifices through the static backflow prevention elements.

2. The dispensing system according to claim 1, wherein the series of static backflow prevention elements is formed by a plurality of walls, dividing the respective chamber up into at least two compartments.

3. The dispensing system according to claim 2, wherein the compartments have a volume of 50 to 400 mm$^3$.

4. The dispensing system according to claim 2, wherein the plurality of walls comprise two alternating sets of walls which protrude into the chamber from two opposing side walls of the chamber.

5. The dispensing system according to claim 2, wherein the walls are arranged in a slanting direction with respect to the forwards flow direction of the respective component through the respective chamber.

6. The dispensing system according to claim 1, wherein the orifices are arranged in a zig-zag configuration.

7. The dispensing system according to claim 1, wherein the static mixing elements comprise a further series of walls forming a meandering or spiraling flow path through the mixing chamber.

8. The dispensing system according to claim 1, wherein the static mixing nozzle is an assembly of a sleeve and an insert, the insert fitting into a cavity of the sleeve.

9. The dispensing system according to claim 8, wherein the static mixing elements and the static backflow prevention elements are provided on the insert.

10. The dispensing system according to claim 7, wherein the sleeve is made of a transparent material, allowing visual inspection of the first, second and mixing chambers.

11. The dispensing system according to claim 1, wherein the lengths of the first and second chambers of the mixing nozzle are a minimum length of 10 mm.

12. A static mixing nozzle for mixing a first component and a second component and dispensing the mixture, the static mixing nozzle comprising
- an inlet part, detachably connectable to outlets of a dispensing gun via which said components are supplied to the inlet part;
- a first section containing a first chamber and a second chamber for conducting the first and second component respectively; and
- a second section containing a mixing chamber with static mixing elements which promote mixing the first and second components and conducting the mixture to a nozzle tip serving as an outlet for the mixture;

wherein at least one of the first and second chambers of the static mixing nozzle contains a series of static backflow prevention elements, arranged for hindering backflow of the respective component within the respective chamber, wherein the flow path for the respective component is formed by a series of orifices through the static backflow prevention elements.

13. The static mixing nozzle according to claim 12, wherein the series of static backflow prevention elements is formed by a plurality of walls, dividing the respective chamber up into at least two compartments.

14. A process of forming a polyurethane foam comprising: (i) providing an isocyanate component comprising a diisocyanate or a polyisocyanate and optionally a blowing agent and/or further additives; (ii) providing a polyol component comprising a blowing agent, a catalyst, a polyol and optionally further additives; and (iii) mixing said isocyanate component and said polyol component to form the polyurethane foam, wherein the mixing step is performed in a static mixing nozzle according to claim 12.

15. The static mixing nozzle of claim 13, wherein the plurality of walls comprise two alternating sets of walls which protrude into the chamber from two opposing side walls of the chamber and/or wherein the walls are arranged in a slanting direction with respect to the forwards flow direction of the respective component through the respective chamber.

16. The static mixing nozzle of claim 12, wherein the orifices are arranged in a zig-zag configuration.

17. The static mixing nozzle of claim 12, wherein the static mixing elements comprise a further series of walls forming a meandering or spiraling flow path through the mixing chamber.

18. The static mixing nozzle of claim 12, wherein the static mixing nozzle is an assembly of a sleeve and an insert, the insert fitting into a cavity of the sleeve.

19. The static mixing nozzle of claim 18, wherein the sleeve is made of a transparent material.

* * * * *